(12) United States Patent
Davter et al.

(10) Patent No.: US 11,148,502 B2
(45) Date of Patent: Oct. 19, 2021

(54) ROOF ASSEMBLY FOR A CABIN OF AGRICULTURAL MACHINE HAVING AN AIR INLET SHIELD

(71) Applicant: DENSO THERMAL SYSTEMS S.p.A., Poirino (IT)

(72) Inventors: Massimo Davter, Poirino (IT); Leone Contento, Poirino (IT)

(73) Assignee: Denso Thermal Systems S.P. A., Poirino (IT)

( * ) Notice: Subject to any disclaimer, the term of this patent is extended or adjusted under 35 U.S.C. 154(b) by 333 days.

(21) Appl. No.: 16/141,284

(22) Filed: Sep. 25, 2018

(65) Prior Publication Data

US 2019/0092120 A1 Mar. 28, 2019

(30) Foreign Application Priority Data

Sep. 26, 2017 (IT) .................. 102017000107690

(51) Int. Cl.
*B60H 1/00* (2006.01)
*B60H 1/24* (2006.01)
*B60H 1/26* (2006.01)

(52) U.S. Cl.
CPC ......... *B60H 1/00378* (2013.01); *B60H 1/245* (2013.01); *B60H 1/262* (2013.01); *B60H 2001/00085* (2013.01); *B60H 2001/00235* (2013.01); *B60Y 2200/22* (2013.01)

(58) Field of Classification Search
CPC .............. B60H 1/245; B60H 1/262; B60H 2001/00085; B60H 2001/00235; B60H 1/00357; B60H 1/00378; B60Y 2200/22

USPC ........................................................ 454/136
See application file for complete search history.

(56) References Cited

U.S. PATENT DOCUMENTS

| | | | | |
|---|---|---|---|---|
| 4,721,031 A | * | 1/1988 | Nakata ............... | B62D 33/0617 296/190.09 |
| 5,921,619 A | * | 7/1999 | Cederberg ......... | B60H 1/00378 296/190.09 |
| 6,361,428 B1 | | 3/2002 | Tosconi et al. | |
| 6,780,097 B2 | * | 8/2004 | Shuttleworth ..... | B60H 1/00378 454/136 |
| 2007/0163747 A1 | | 7/2007 | Baro et al. | |

OTHER PUBLICATIONS

Italian Search Report and Written Opinion for Italian Patent Application 102017000107690 dated Jun. 12, 2018.

* cited by examiner

*Primary Examiner* — Kenneth J Hansen
*Assistant Examiner* — Phillip Decker
(74) *Attorney, Agent, or Firm* — Thomas|Horstemeyer LLP

(57) ABSTRACT

A roof assembly for a vehicle cabin, particularly for the cabin of an agricultural machine, comprising a housing of plastic material and an air conditioning unit housed within the housing, and at least one air inlet fluidically connected to the air conditioning unit and arranged at a periphery of the housing, and a filter arranged downstream of the air inlet. An air inlet shield is arranged at the air inlet, said air inlet shield being mounted to the periphery of the housing and sealingly mounted to the air inlet, the air inlet shield comprising a pair of shaped plates of plastic material, peripherally welded to each other, between which a chamber fluidically communicating with the filter and with the outside of the roof assembly is defined.

6 Claims, 2 Drawing Sheets

ROOF ASSEMBLY FOR A CABIN OF AGRICULTURAL MACHINE HAVING AN AIR INLET SHIELD

CLAIM OF PRIORITY TO RELATED APPLICATIONS

This application claims priority to Italian Patent Application having Serial No. 102017000107690, filed on Sep. 26, 2017, which is entirely incorporated herein by reference.

SUMMARY

The present invention relates to a roof assembly for a vehicle cabin, particularly for the cabin of an agricultural machine, comprising:

a housing of plastic material and an air conditioning unit housed within the housing, and at least one air inlet fluidically connected to the air conditioning unit and arranged at a periphery of the housing, and a filter arranged downstream of the air inlet.

In the agricultural machinery field it is known to use filters of various categories to remove contaminants from the air intended for the air conditioning of the cabin. Such filters generally comprise a filtering part of fibrous material, the performance whereof can be seriously compromised by contact with relatively large quantities of water, such as it is possible to have in the event of rain or washing the vehicle with water at a higher or lower pressure.

Solutions are known in which the air inlet is provided with doors to close the air inlet and thus protect the filter arranged downstream of the inlet. In some situations, however, it is not possible to close the air inlet, because this would prevent the entry of fresh air for the air conditioning of the vehicle cabin, thus not ensuring adequate pressurization inside the cabin. Furthermore, if the vehicle is washed with high pressure water, the doors may not be sufficient to protect the filter. Consequently, the filter is sometimes removed before washing the machine.

An object of the present invention is therefore to provide a roof assembly which allows overcoming the limits of conventional systems.

For these purposes, the object of the invention is a roof assembly of the type defined at the beginning, wherein an air inlet shield is arranged at the air inlet, said air inlet shield being mounted to the periphery of the housing and sealingly mounted to the air inlet, the air inlet shield comprising a pair of shaped plates of plastic material, peripherally welded to each other, between which a chamber fluidically communicating with the filter and with the outside of the roof assembly is defined.

According to the invention, the air inlet shield provides a double wall in front of the air inlet which can be configured to create an inlet air path to the filter which is tortuous, or at least not straight. This zeroes or at least reduces the probability that the water reaches the filter in the event of rain or washing of the machine.

It is therefore possible to wash the vehicle, even at high pressure, without this causing problems to the filter. It is therefore no longer necessary to remove the filter to wash the machine. Furthermore, it is possible to use the machine and its air conditioning system even in case of rain.

Advantageously, the fact of having a double wall in front of the air inlet also allows having great design freedom with respect to the choice on where to place the windows that draw the air from the outside.

BRIEF DESCRIPTION OF THE DRAWINGS

Further features and advantages of the roof assembly according to the invention will become apparent from the following detailed description of an embodiment of the invention, made with reference to the accompanying drawings, provided for illustrative and non-limiting purposes only, in which.

DETAILED DESCRIPTION

Figure 1:
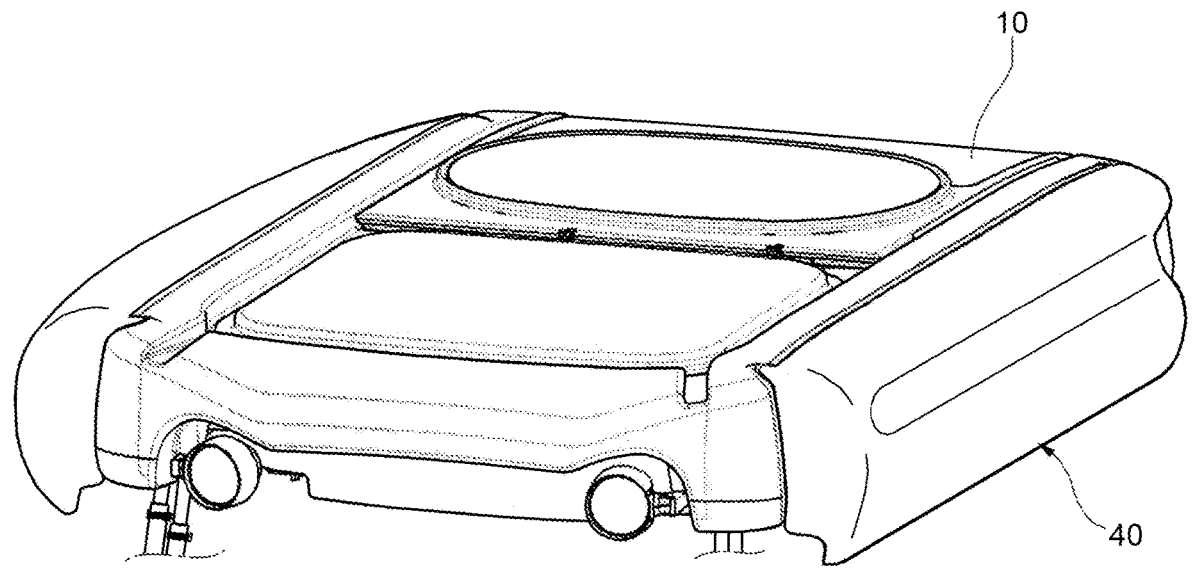
FIG. 1 schematically shows a roof assembly according to the invention.
Figure 2:
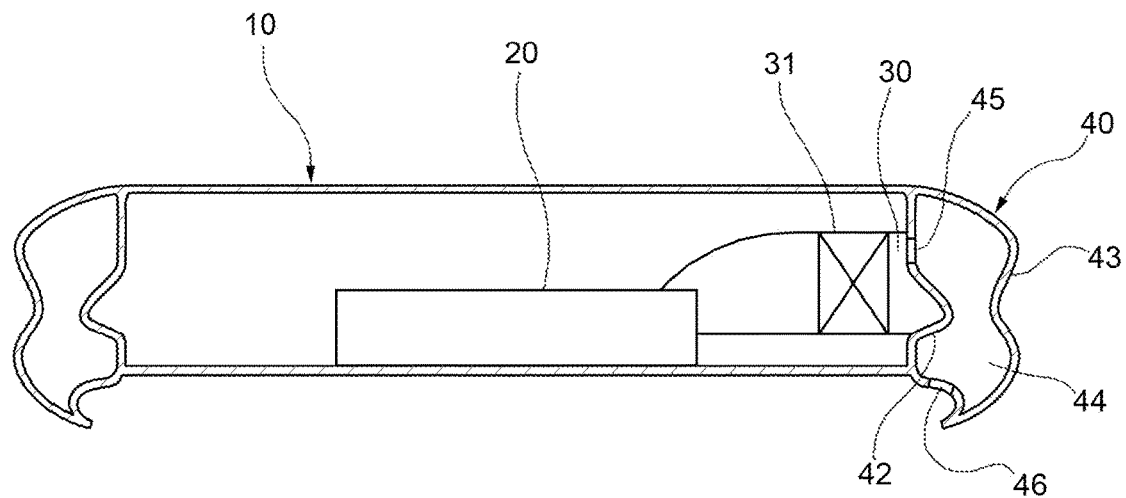
FIG. 2 is a schematic cross-sectional view of the roof assembly.

FIGS. 1 and 2 schematically represent a roof assembly for an agricultural machine cabin, conventionally comprising a plastic housing 10 and an air conditioning unit 20 housed inside the casing 10, as well as at least one air inlet 30 fluidically connected with the air conditioning unit 20 and located at the periphery of the casing 10. Through the air inlet 30, the air conditioning unit 20 conventionally draws air from outside and feeds it into the vehicle cabin, in a manner known per se, after having treated it.

Downstream of the air inlet 30 and upstream of the air conditioning unit 20, at least one filter 31 is arranged, conventionally provided for the removal of the contaminants from the air intended to be introduced into the cabin.

Figure 3:
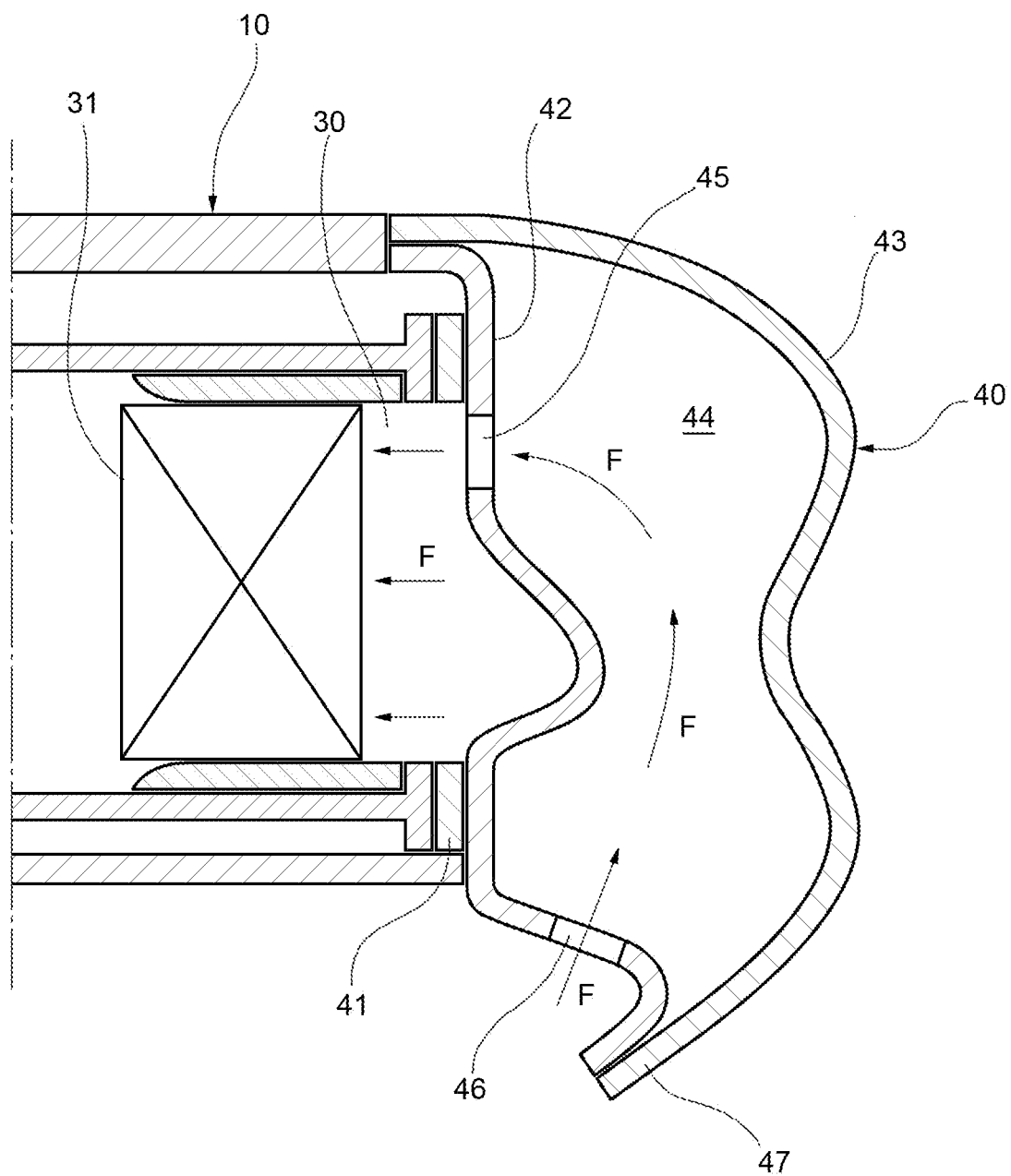
FIG. 3 is an enlarged-scale view taken at an air inlet.

With reference to FIG. 3, at the air inlet 30 there is arranged an air inlet shield 40 mounted on the periphery of the casing 10, so as to be positioned tightly on the air inlet 30. In the illustrated example, the seal is obtained by a gasket 41, interposed between an edge of the air inlet 40 and the air inlet shield 40.

The air inlet shield 40 comprises a pair of shaped plates 42, 43 of plastic material, peripherally welded to each other, between which a chamber 44 fluidically communicating with the air inlet and with the outside of the roof assembly is defined. The shaped plates 42, 43 therefore form an inner wall and an outer wall, respectively, which enclose the chamber 44. The inner wall or plate 42 is sealably mounted on the edge of the air inlet 30, while the outer sheet or wall 43 is peripherally welded to the inner sheet or wall 42.

The air inlet shield 40 may be made by twin-sheet thermoforming. This technique conventionally provides that two separate sheets of plastic material are heated simultaneously. A sheet is pulled against a respective first die part and the other plate is pulled against a respective second die part by vacuum application. The two die parts are closed by pressing the two sheets against each other at their perimeter. Air (or other gaseous fluid) is then blown between the sheets, the pressure of which causes each of the sheets to conform to the shape of the respective die part. Finally, the result of the process is a structurally rigid hollow piece. Further processing is possible to obtain the final shape of the air inlet shield 40.

The air inlet shield 40 has at least one internal window 45, obtained in the inner sheet or wall 42, through which the chamber 44 is fluidically communicating with the filter 31. The air inlet shield 40 further comprises at least one external window 46, obtained in the inner sheet or wall 42 and/or in the outer sheet or wall 43, through which the chamber 44 is fluidly communicating with the exterior of the roof assembly. The air inlet shield 40 defines an air inlet path (represented by the arrows F in FIG. 3) from the external window 46 to the filter 31 which has a non-rectilinear course.

In the example shown, the chamber 44 of the air inlet shield 40 fluidically communicates with the outside of the roof assembly through at least one outer window 46 formed on a downwardly facing lower part of the air inlet shield 40, in particular on a lower part of the inner wall 42 facing downwards.

Furthermore, the air inlet shield 40 preferably forms a protective barrier 47 extending downwardly beyond the outer window 46. This barrier 47 provides a further obstacle to the penetration of water, particularly in the case of rain. The shield barrier 47 is arranged in a more peripheral position, i.e. more external than the outer window 46. Advantageously, the shield barrier 47 is formed by lower edges of the inner plate 42 and outer plate 43 welded to each other.

The invention claimed is:

1. A roof assembly for a vehicle cabin of an agricultural machine, comprising:
    a housing of plastic material and an air conditioning unit housed within the housing, and
    at least one air inlet fluidically connected to the air conditioning unit and arranged at a periphery of the housing, and a filter arranged downstream of the at least one air inlet,
    wherein an air inlet shield is arranged at the at least one air inlet, said air inlet shield being mounted to the periphery of the housing and sealingly mounted to the at least one air inlet, said air inlet shield comprising a pair of shaped plates of plastic material, peripherally welded to each other and arranged upstream of the filter, between the pair of shaped plates there being defined a chamber fluidically communicating with the filter and with the outside of the roof assembly,
    wherein the chamber of the air inlet shield fluidically communicates with the outside of the roof assembly through at least one outer window formed on a downwardly facing lower part of the air inlet shield, and
    wherein the air inlet shield forms a shield barrier downwardly extending past the at least one outer window, said shield barrier being arranged at a more peripheral position than the at least one outer window.

2. The roof assembly of claim 1, wherein said pair of shaped plates comprises an inner plate sealingly mounted to the at least one air inlet, and an outer plate peripherally welded to the inner plate.

3. The roof assembly of claim 2, wherein the chamber of the air inlet shield fluidically communicates with the filter through at least one inner window formed through the inner plate.

4. The roof assembly of claim 2, wherein the at least one outer window is formed on a downwardly facing lower part of the inner plate.

5. A roof assembly for a vehicle cabin of an agricultural machine, comprising:
    a housing of plastic material and an air conditioning unit housed within the housing, and
    at least one air inlet fluidically connected to the air conditioning unit and arranged at a periphery of the housing, and a filter arranged downstream of the at least one air inlet,
    wherein an air inlet shield is arranged at the at least one air inlet, said air inlet shield being mounted to the periphery of the housing and sealingly mounted to the at least one air inlet, said air inlet shield comprising a pair of shaped plates of plastic material, peripherally welded to each other and arranged upstream of the filter, between the pair of shaped plates there being defined a chamber fluidically communicating with the filter and with the outside of the roof assembly,
    wherein said pair of shaped plates comprises an inner plate sealingly mounted to the air inlet, and an outer plate peripherally welded to the inner plate,
    wherein the chamber of the air inlet shield fluidically communicates with the outside of the roof assembly through at least one outer window formed through the inner plate and/or the outer plate,
    wherein the at least one outer window is formed on a downwardly facing lower part of the inner plate, and
    wherein the air inlet shield forms a shield barrier downwardly extending past the at least one outer window, said shield barrier being arranged at a more peripheral position than the at least one outer window.

6. The roof assembly of claim 5, wherein said shield barrier is formed by lower edges of the inner plate and outer plate welded to each other.

\* \* \* \* \*